United States Patent
Makin et al.

(10) Patent No.: US 9,354,908 B2
(45) Date of Patent: May 31, 2016

(54) INSTANTLY RESTORING VIRTUAL MACHINES BY PROVIDING READ/WRITE ACCESS TO VIRTUAL DISK BEFORE THE VIRTUAL DISK IS COMPLETELY RESTORED

(71) Applicant: Symantec Corporation, Mountain View, CA (US)

(72) Inventors: Gaurav Makin, Shoreview, MN (US); Srikant Sharma, Sunnyvale, CA (US)

(73) Assignee: Veritas Technologies, LLC, Mountain View, CA (US)

( * ) Notice: Subject to any disclaimer, the term of this patent is extended or adjusted under 35 U.S.C. 154(b) by 312 days.

(21) Appl. No.: 13/944,507

(22) Filed: Jul. 17, 2013

(65) Prior Publication Data

US 2015/0026676 A1    Jan. 22, 2015

(51) Int. Cl.
  *G06F 9/46*   (2006.01)
  *G06F 9/455*  (2006.01)
  *G06F 9/50*   (2006.01)
  *G06F 11/14*  (2006.01)

(52) U.S. Cl.
  CPC ........ *G06F 9/45533* (2013.01); *G06F 9/45558* (2013.01); *G06F 9/505* (2013.01); *G06F 11/1458* (2013.01); *G06F 11/1469* (2013.01); *G06F 2009/4557* (2013.01)

(58) Field of Classification Search
  None
  See application file for complete search history.

(56) References Cited

U.S. PATENT DOCUMENTS

| | | | |
|---|---|---|---|
| 5,606,681 A * | 2/1997 | Smith | G06F 12/08 710/5 |
| 6,912,631 B1 | 6/2005 | Kekre et al. | |
| 6,931,558 B1 | 8/2005 | Jeffe et al. | |
| 7,024,527 B1 | 4/2006 | Ohr | |
| 7,093,086 B1 | 8/2006 | van Rietschote | |
| 7,194,487 B1 | 3/2007 | Kekre et al. | |
| 7,293,146 B1 | 11/2007 | Kekre et al. | |
| 7,356,679 B1 | 4/2008 | Le et al. | |
| 7,480,822 B1 | 1/2009 | Arbon et al. | |
| 7,552,358 B1 | 6/2009 | Asgar-Deen et al. | |

(Continued)

FOREIGN PATENT DOCUMENTS

EP    2234018    9/2010

OTHER PUBLICATIONS

Subash Rajaa; Systems and Methods for Managing Affinity Rules in Virtual-Machine Environments; U.S. Appl. No. 13/686,330, filed Nov. 27, 2012.

(Continued)

*Primary Examiner* — Wissam Rashid
(74) *Attorney, Agent, or Firm* — ALG Intellectual Property, LLC

(57) ABSTRACT

A computer-implemented method for instantly restoring virtual machines in high input/output load environments may include (1) identifying a hypervisor that is configurable to maintain simultaneous connections to multiple datastores of a network-attached-storage system, (2) receiving a request to activate a new virtual machine on the hypervisor, (3) determining a usage of at least one connection from the hypervisor to at least one datastore of the network-attached-storage system, and (4) selecting, based on the usage of the connection, a designated connection from the hypervisor to a designated datastore of the network-attached storage system for use by the new virtual machine to store data on the network-attached-storage system. Various other methods, systems, and computer-readable media are also disclosed.

20 Claims, 6 Drawing Sheets

(56) References Cited

U.S. PATENT DOCUMENTS

| | | |
|---|---|---|
| 7,631,020 B1 | 12/2009 | Wei et al. |
| 7,669,020 B1 | 2/2010 | Shah |
| 7,721,138 B1 | 5/2010 | Lyadvinsky et al. |
| 7,797,281 B1 | 9/2010 | Greene et al. |
| 7,805,631 B2 | 9/2010 | Fries |
| 7,809,693 B2 | 10/2010 | Lango et al. |
| 7,827,150 B1 | 11/2010 | Wu et al. |
| 7,831,550 B1 | 11/2010 | Pande et al. |
| 7,831,861 B1 | 11/2010 | Greene et al. |
| 7,937,545 B1 | 5/2011 | Wu et al. |
| 7,937,547 B2 | 5/2011 | Liu et al. |
| 8,019,732 B2 | 9/2011 | Paterson-Jones et al. |
| 8,046,550 B2 | 10/2011 | Feathergill |
| 8,060,476 B1 | 11/2011 | Alfonso et al. |
| 8,099,391 B1 | 1/2012 | Monckton |
| 8,117,168 B1 | 2/2012 | Stringham |
| 8,135,748 B2 | 3/2012 | Rosikiewicz et al. |
| 8,140,906 B1 | 3/2012 | Searls et al. |
| 8,161,321 B2 | 4/2012 | Zheng et al. |
| 8,185,505 B1 | 5/2012 | Blitzer et al. |
| 8,209,290 B1 | 6/2012 | Dowers, II et al. |
| 8,209,680 B1 | 6/2012 | Le et al. |
| 8,219,769 B1 | 7/2012 | Wilk |
| 8,230,187 B1 | 7/2012 | Krinke, II et al. |
| 8,239,646 B2 | 8/2012 | Colbert et al. |
| 8,261,282 B1 * | 9/2012 | Ponnapur ............. G06F 9/505 718/1 |
| 8,290,912 B1 | 10/2012 | Searls et al. |
| 8,307,177 B2 | 11/2012 | Prahlad et al. |
| 8,315,983 B1 | 11/2012 | Sumant et al. |
| 8,315,986 B1 | 11/2012 | Kapoor et al. |
| 8,332,689 B2 | 12/2012 | Timashev et al. |
| 8,346,726 B2 | 1/2013 | Liu et al. |
| 8,346,727 B1 | 1/2013 | Chester et al. |
| 8,346,891 B2 | 1/2013 | Safari et al. |
| 8,355,407 B2 | 1/2013 | Wookey et al. |
| 8,386,733 B1 | 2/2013 | Tsaur et al. |
| 8,397,088 B1 * | 3/2013 | Ghose ............... G06F 1/206 713/300 |
| 8,402,309 B2 | 3/2013 | Timashev et al. |
| 8,438,349 B2 | 5/2013 | Olson et al. |
| 8,443,166 B2 | 5/2013 | Czezatke et al. |
| 8,464,254 B1 | 6/2013 | Vohra et al. |
| 8,473,463 B1 | 6/2013 | Wilk |
| 8,489,552 B1 | 7/2013 | Dowers, II et al. |
| 8,489,830 B2 | 7/2013 | Wu et al. |
| 8,510,271 B1 | 8/2013 | Tsaur et al. |
| 8,527,990 B1 | 9/2013 | Marathe et al. |
| 8,555,009 B1 | 10/2013 | Majahan et al. |
| 8,565,545 B1 | 10/2013 | Syed et al. |
| 8,566,640 B2 | 10/2013 | Timashev et al. |
| 2007/0043860 A1 | 2/2007 | Pabari |
| 2008/0155223 A1 * | 6/2008 | Hiltgen ............ G06F 9/45558 711/173 |
| 2008/0243953 A1 | 10/2008 | Wu et al. |
| 2009/0172666 A1 * | 7/2009 | Yahalom ............ G06F 3/0605 718/1 |
| 2009/0249284 A1 | 10/2009 | Antosz et al. |
| 2009/0313447 A1 | 12/2009 | Nguyen et al. |
| 2010/0058106 A1 | 3/2010 | Srinivasan et al. |
| 2010/0077137 A1 | 3/2010 | Soemo et al. |
| 2010/0107158 A1 | 4/2010 | Chen et al. |
| 2010/0115332 A1 | 5/2010 | Zheng et al. |
| 2010/0169592 A1 | 7/2010 | Atluri |
| 2010/0262586 A1 | 10/2010 | Rosikiewicz et al. |
| 2010/0268568 A1 | 10/2010 | Ochs et al. |
| 2011/0119462 A1 | 5/2011 | Leach et al. |
| 2011/0173405 A1 | 7/2011 | Grabarnik et al. |
| 2011/0271010 A1 * | 11/2011 | Kenchammana ......... G06F 3/06 709/244 |
| 2011/0276539 A1 | 11/2011 | Thiam |
| 2012/0017114 A1 | 1/2012 | Timashev et al. |
| 2012/0109897 A1 | 5/2012 | Janakiraman et al. |
| 2012/0110279 A1 | 5/2012 | Fredricksen et al. |
| 2012/0151273 A1 | 6/2012 | Ben Or et al. |
| 2013/0007854 A1 | 1/2013 | Sorenson, III et al. |
| 2014/0067763 A1 | 3/2014 | Jorapurkar et al. |

OTHER PUBLICATIONS

Subash Rajaa et al.; Systems and Methods for Managing Multipathing Configurations for Virtual Machines; U.S. Appl. No. 13/548,195, filed Jul. 12, 2012.

Manning, Paul, "Best Practices for running VMware vSphere on Network Attached Storage", http://www.vmware.com/files/pdf/techpaper/VMware-NFS-BestPractices-WP-EN.pdf, as accessed on Oct. 8, 2014, White Paper, VMware, (May 19, 2010).

"vSphere Storage—ESXi 5.0, vCenter Server 5.0", http://pubs.vmware.com/vsphere-50/topic/com.vmware.ICbase/PDF/vsphere-esxi-vcenter-server-50-storage-guide.pdf, as accessed on Oct. 8, 2014, VMware, Inc., (Nov. 8, 2011).

"Symantec NetBackup for VMware Administrator's Guide—Release 7.5", http://kbdownload.symantec.com/resources/sites/Business/content/live/DOCUMENTATION/5000/DOC5162/en_US/NetBackup7.5_AdminGuide_VMware.pdf?_gda_=1411393770_c2402ef79d42f0c9f8c7a29f0e476017, as accessed on Oct. 8, 2014, Symantec Corporation, (Jan. 12, 2012).

Atul Akolkar, et al; Systems and Methods for Enhancing Virtual Machine Backup Image Data; U.S. Appl. No. 12/950,972, filed Nov. 19, 2010.

Subash Rajaa, et al; Systems and Methods for Facilitating Substantially Continuous Availability of Multi-Tier Applications Within Computer Clusters; U.S. Appl. No. 13/524,367, filed Jun. 15, 2012.

Shailesh Vaman Marathe, et al; Systems and Methods for Migrating Virtual Machines; U.S. Appl. No. 13/097,635, filed Apr. 29, 2011.

Check Sabjan, et al; Systems and Methods for Enabling Virtual Environments to Mount Non-Native Storage Disks; U.S. Appl. No. 13/863,886, filed Apr. 16, 2013.

Deb Banerjee; Systems and Methods for Workload Security in Virtual Data Centers; U.S. Appl. No. 13/291,716, filed Nov. 8, 2011.

Deb Banerjee; Systems and Methods for Enforcing Secure Network Segmentation for Sensitive Workloads; U.S. Appl. No. 13/945,373, filed Jul. 18, 2013.

Davies, Alex, "NetBackup Disk Based Date Protection Options", Symantec Corporation, (Oct. 2007).

Gaurav Makin, et al; Systems and Methods for Restoring Distributed Applications Within Virtual Data Centers; U.S. Appl. No. 13/972,426, filed Aug. 21, 2013.

Atul Khandelwal, et al.; Systems and Methods for Managing Virtual Machine Backups; U.S. Appl. No. 13/954,602, filed Jul. 30, 2013.

Xianbo Zhang, et al.; Systems and Methods for Prefetching Subsequent Data Segments; U.S. Appl. No. 13/961,685, filed Aug. 7, 2013.

"How to configure and use Exchange Granular Restore in NetBackup 6.5.3 and Later.", Symantec Corporation; Article ID: TECH66342, (Jan. 29, 2008).

"Symantec Declares Deduplication Everywhere", Symantec Corporation; Press Release, (Jul. 7, 2009).

Simpson, Dave "PHD Virtual Improves VM Backups", Infostor, vol. 13, No. 6, (Jun. 1, 2009).

"Arkeia Delivers New vStorage-based Backup Agent for VMWare", PR Newswire, (Jun. 30, 2010).

"CA Inc: CA Delivers Comprehensive Recovery Management to Support Data Storage, Backup and Recovery; New Releases of CA ARCserve Backup and CA XOsoft Leverage Virtualization, Data Deduplication, Storage Resource Management and DR Testing to Support Lean IT", M2 PressWIRE, (Apr. 27, 2009).

Komiega, Kevin "Symantec to expand deduplication.", Infostor, vol. 13, No. 8, (Aug. 1, 2009).

"Customer FAQ-Symantec Backup Exec 12.5 for Windows Servers and Symantec Backup Exec System Recovery 8.5", Symantec Corporation, (Aug. 2008).

Fegreus, Jack, "Analysis: Minimizing System Risk via End-to-End Backup and Recovery Process Automation", openBench Labs, (Sep. 10, 2009).

"Complete Data Protection for VMWare Virtual Environments", Hewlett-Packard, ESG Research Report, ESG IT Infrastructure and Service Management Survey, (Mar. 2008).

(56) References Cited

OTHER PUBLICATIONS

"Symantec NetBackup for VMWare Administrator's Guide, UNIX, Windows, and Linux, Release 7.0.1", Symantec Corporation, (2010).
"Symantec NetBackup Administrator's Guide, vol. 1, UNIX and Linux, Release 7.0.1", Symantec Corporation, (2010).
"File Level Restore, VMware Data Recovery 1.0", VMware, Inc., (2009).
"Administration Guide, Site Recovery Manager 1.0 Update 1", VMware, Inc., (2008).
"vSphere Web Services SDK Programming Guide, vSphere Web Services SDK 4.0", VMware, Inc., (2009).
"vSphere Basic System Administration, vCenter Server 4.0, ESX 4.0, ESXi 4.0", VMware, Inc., (2009-2011).
"Optimized Backup and Recovery for VMware Infrastructure with EMC Avamar", VMware, Inc., White Paper, (2007).
"Symantec NetBackup PureDisk Getting Started Guide, Windows Linux, and UNIX, Release 6.6, Publication release 6.6, revision 2", Symantec Corporation, (2009).
"Veeam Backup & Replication v5 Preview—SureBackup, U-AIR and Instant VM Recovery", http://www.veeam.com/blog/veeam-backup-replication-v5-preview-surebackup-u-air-and-instant-vm-recovery.html, (Aug. 15, 2010).
Gostev, Anton "Migration (VMware: [FAQ] Frequently Asked Questions)", http://forums.veeam.com/viewtopic.php?f=24&t=9329#p39955, Veeam Community Forums, (Nov. 2011).
Arts, Henk "Veeam Backup and Replication v5", http://www.slideshare.net/henkarts/veeam-backup-and-replication-v5, Veeam Software Inc., (Nov. 1, 2010).
Hazelman, Doug "vPower Demo: Instant VM Recovery, U-AIR, Instant File-Level Restore", http://www.youtube.com/watch?v=zbZMsk2Prgw, (Jan. 28, 2011).
"Veeam Backup & Replication 5.0: User Guide", http://www.veeam.com/files/guide/veeam_backup_5_0_user_guide.pdf, Veeam Software Inc., (Oct. 2010).
Paul, Justin "Veeam vPower Instant Recovery", http://jpaul.me/?p=1425, Justin's ITBlog, (Mar. 24, 2011).
Makin, Gaurav et al., "Method to Reduce the RTO of an Application by Running the Application Directly from its Backup Image in a Virtualization Environment", http://ip.com/IPCOM/000217035, Symantec Corporation, (Apr. 27, 2012).
"Veeam Backup & Replication: What's New in v6", http://www.vmc-company.ru/pdf/veeam/veeam_backup_6_0_whats_new.pdf, Veeam Software Inc., (Nov. 18, 2011).
Ravindra Teli, et al.; Optimized Restore of Virtual Machine and Virtual Disk Data; U.S. Appl. No. 13/661,258, filed Oct. 26, 2012.
Amit Haridas Rangari, et al.; Systems and Methods for Enabling Migratory Virtual Machines to Expedite Access to Resources; U.S. Appl. No. 13/928,340, filed Jun. 26, 2013.

* cited by examiner

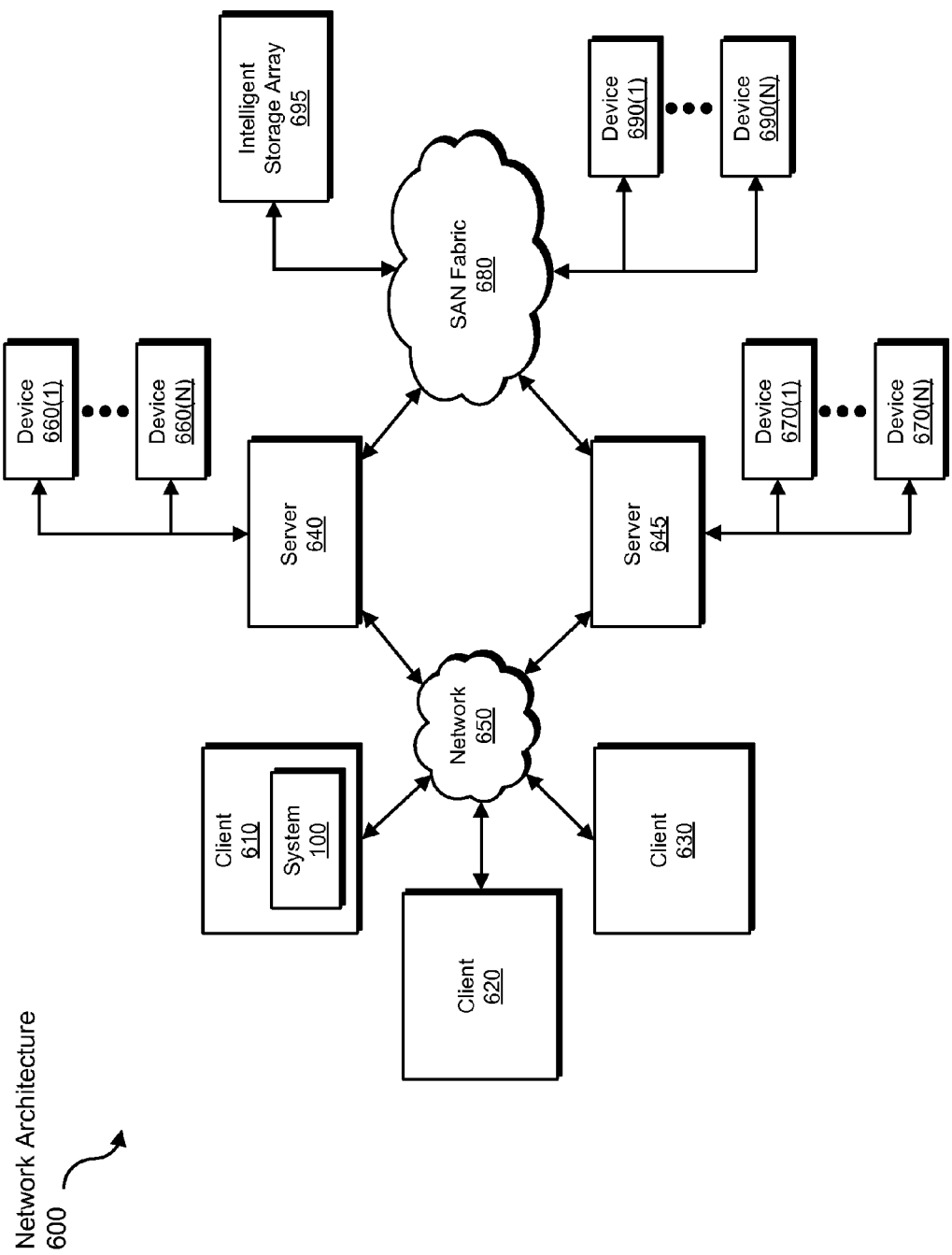

INSTANTLY RESTORING VIRTUAL MACHINES BY PROVIDING READ/WRITE ACCESS TO VIRTUAL DISK BEFORE THE VIRTUAL DISK IS COMPLETELY RESTORED

BACKGROUND

Business continuity and disaster recovery refers to the capability to restore normal (or near-normal) business operations, from a critical business application perspective, after the occurrence of a disaster that interrupts business operations. Business continuity and disaster recovery may require the ability to bring up mission-critical applications and the data these applications depend on and make them available to users as quickly as business requirements dictate.

In order to facilitate business continuity, some organizations may wish to use backup disk images within virtual machines in failover scenarios. For example, some traditional systems may instantiate a virtual machine to use a backup disk image for immediate access to data and also perform a live migration of the disk image from the backup location to a production location.

Unfortunately, when these traditional systems instantiate multiple virtual machines, these virtual machines may suffer from poor performance. For example, high input/output latency caused asynchronous input/output operations for the live migration of one virtual machine may impede the synchronous input/output operations of an application running within another virtual machine.

Accordingly, the instant disclosure identifies and addresses a need for additional and improved systems and methods for instantly restoring virtual machines in high input/output load environments.

SUMMARY

As will be described in greater detail below, the instant disclosure generally relates to systems and methods for instantly restoring virtual machines in high input/output load environments by using multiple connections to datastores from a hypervisor and accounting for projected input/output loads and/or input/output latency caused by live migration of virtual machines via the connections to the datastores when selecting connections to datastores for instantiating virtual machines.

In one example, a computer-implemented method for instantly restoring virtual machines in high input/output load environments may include (1) identifying a hypervisor that is configurable to maintain simultaneous connections to multiple datastores of a network-attached-storage system, (2) receiving a request to activate a new virtual machine on the hypervisor, (3) determining a usage of at least one connection from the hypervisor to at least one datastore of the network-attached-storage system, and (4) selecting, based on the usage of the connection, a designated connection from the hypervisor to a designated datastore of the network-attached storage system for use by the new virtual machine to store data on the network-attached-storage system.

In one embodiment, determining the usage of the connection may include determining that the hypervisor is configurable to maintain an additional connection to an additional datastore of the network-attached-storage system. In this embodiment, selecting the designated connection to the designated datastore may include selecting the additional connection to the additional datastore for use by the new virtual machine to store data on the network-attached-storage system.

In one embodiment, determining the usage of the connection may include determining that the hypervisor has reached a maximum number of connections to datastores of the network-attached-storage system. In this embodiment, selecting the designated connection to the designated datastore may include determining that an input/output load on the designated connection to the designated datastore is less than an additional input/output load on an additional connection to an additional datastore of the network-attached-storage system.

In some examples, determining the usage of the connection to the datastore may include (1) identifying a restoration operation that is restoring a virtual machine backup by using the connection to the datastore, (2) identifying a progress indicator of the restoration operation, and (3) predicting an input/output load on the connection to the datastore based on the progress indicator. Additionally or alternatively, determining the usage of the connection to the datastore may include (1) identifying an input/output queue that is used to queue input/output operations transmitted to the network-attached-storage system via the connection to the datastore, and (2) predicting an expected latency of at least one additional input/output operation based on a size of the input/output queue.

In one embodiment, determining the usage of the connection to the datastore may include determining a degree to which the connection to the datastore is used for asynchronous input/output operations. In this embodiment, selecting the designated connection to the designated datastore may be based at least in part on the degree to which the connection to the datastore is used for asynchronous input/output operations. Additionally or alternatively, determining the usage of the connection to the datastore may include determining a degree to which the connection to the datastore is used for synchronous input/output operations. In this example, selecting the designated connection to the designated datastore may be based at least in part on the degree to which the connection to the datastore is used for synchronous input/output operations. In some examples, determining the usage of the connection to the datastore may include determining that the usage includes read operations from a deduplicated storage system.

In some examples, receiving the request to activate the new virtual machine may include receiving a request to perform an instant recovery of the new virtual machine, wherein the instant recovery may include providing an application with read/write access to data stored within a virtual disk of the new virtual machine before the virtual disk has been completely restored.

In some examples, determining the usage of the connection to the datastore may include determining that the usage includes an instant recovery of a virtual machine, where the instant recovery includes providing an application with read/write access to data stored within a virtual disk of the virtual machine before the virtual disk has been completely restored.

In some examples, the computer-implemented method may further include activating the new virtual machine using the designated connection from the hypervisor to the designated datastore of the network-attached storage system.

In one embodiment, a system for implementing the above-described method may include (1) an identification module that identifies a hypervisor that is configurable to maintain simultaneous connections to multiple datastores of a network-attached-storage system, (2) a receiving module that receives a request to activate a new virtual machine on the hypervisor, (3) a determination module that determines a usage of at least one connection from the hypervisor to at least one datastore of the network-attached-storage system, (4) a selection module that selects, based on the usage of the connection, a designated connection from the hypervisor to a designated datastore of the network-attached storage system for use by the new virtual machine to store data on the network-attached-storage system, and (5) at least one processor configured to execute the identification module, the receiving module, the determination module, and the selection module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a hypervisor that is configurable to maintain simultaneous connections to multiple datastores of a network-attached-storage system, (2) receive a request to activate a new virtual machine on the hypervisor, (3) determine a usage of at least one connection from the hypervisor to at least one datastore of the network-attached-storage system, and (4) select, based on the usage of the connection, a designated connection from the hypervisor to a designated datastore of the network-attached storage system for use by the new virtual machine to store data on the network-attached-storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a block diagram of an exemplary computing network capable of implementing one or more of the embodiments described and/or illustrated herein.

Figure 1:
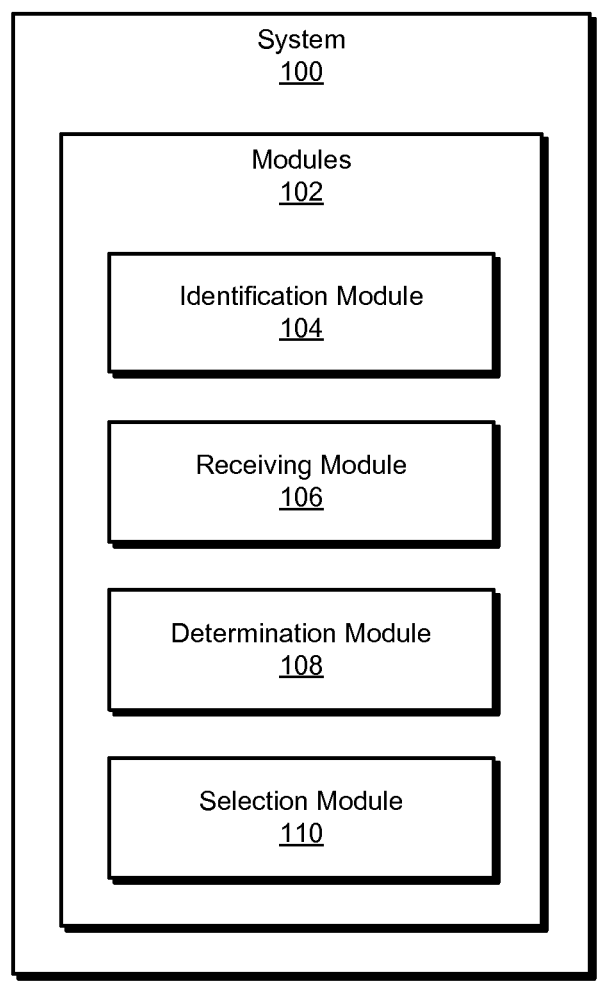
FIG. 1 is a block diagram of an exemplary system for instantly restoring virtual machines in high input/output load environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for instantly restoring virtual machines in high input/output load environments. As will be explained in greater detail below, by using multiple connections to datastores from a hypervisor to distribute the input/output load of multiple virtual machines (e.g., that are in various stages of instant recovery and live migration), the systems described herein may reduce input/output latency and thereby improve the performance of applications within virtual machines.

Figure 2:
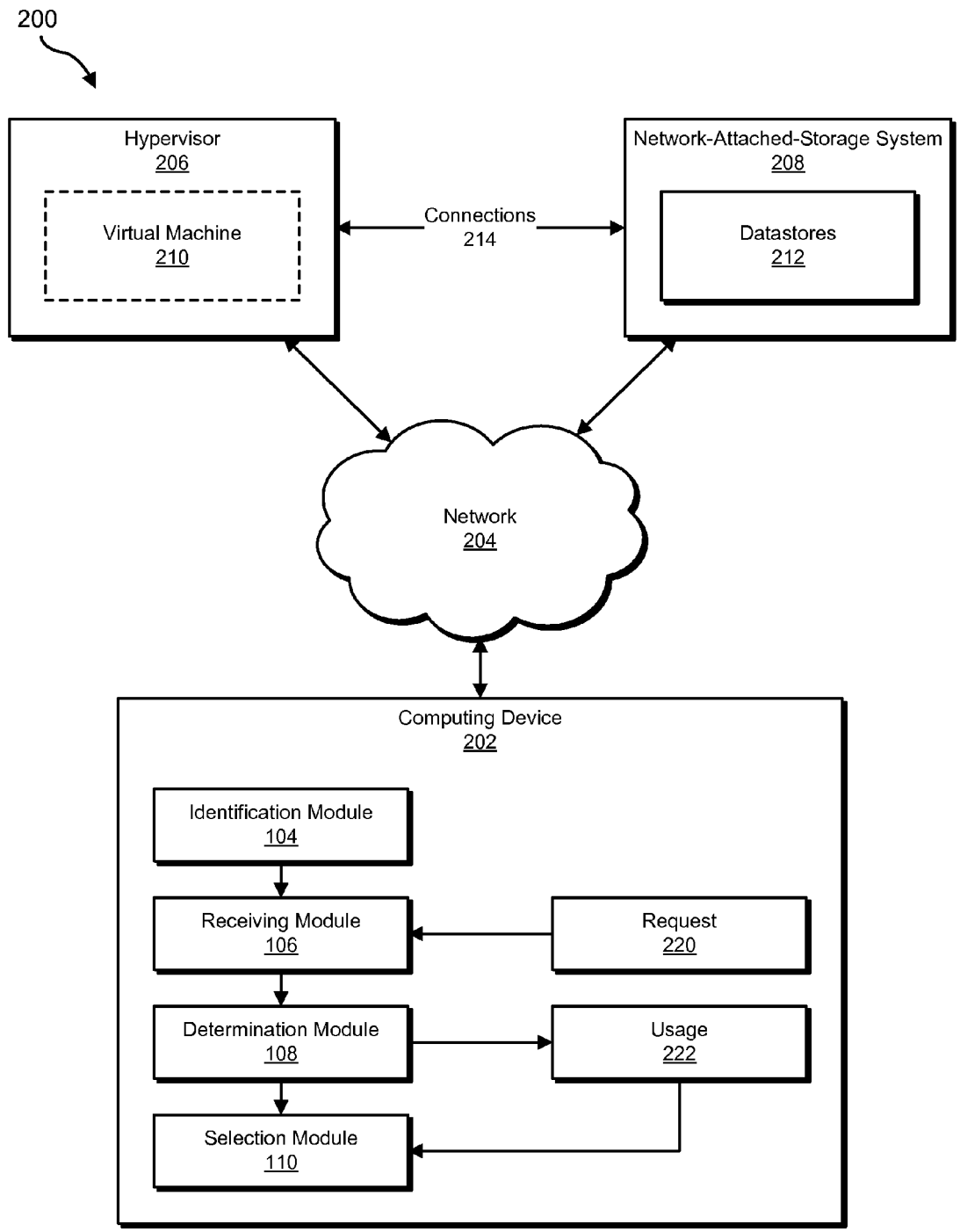
FIG. 2 is a block diagram of an exemplary system for instantly restoring virtual machines in high input/output load environments.
Figure 3:
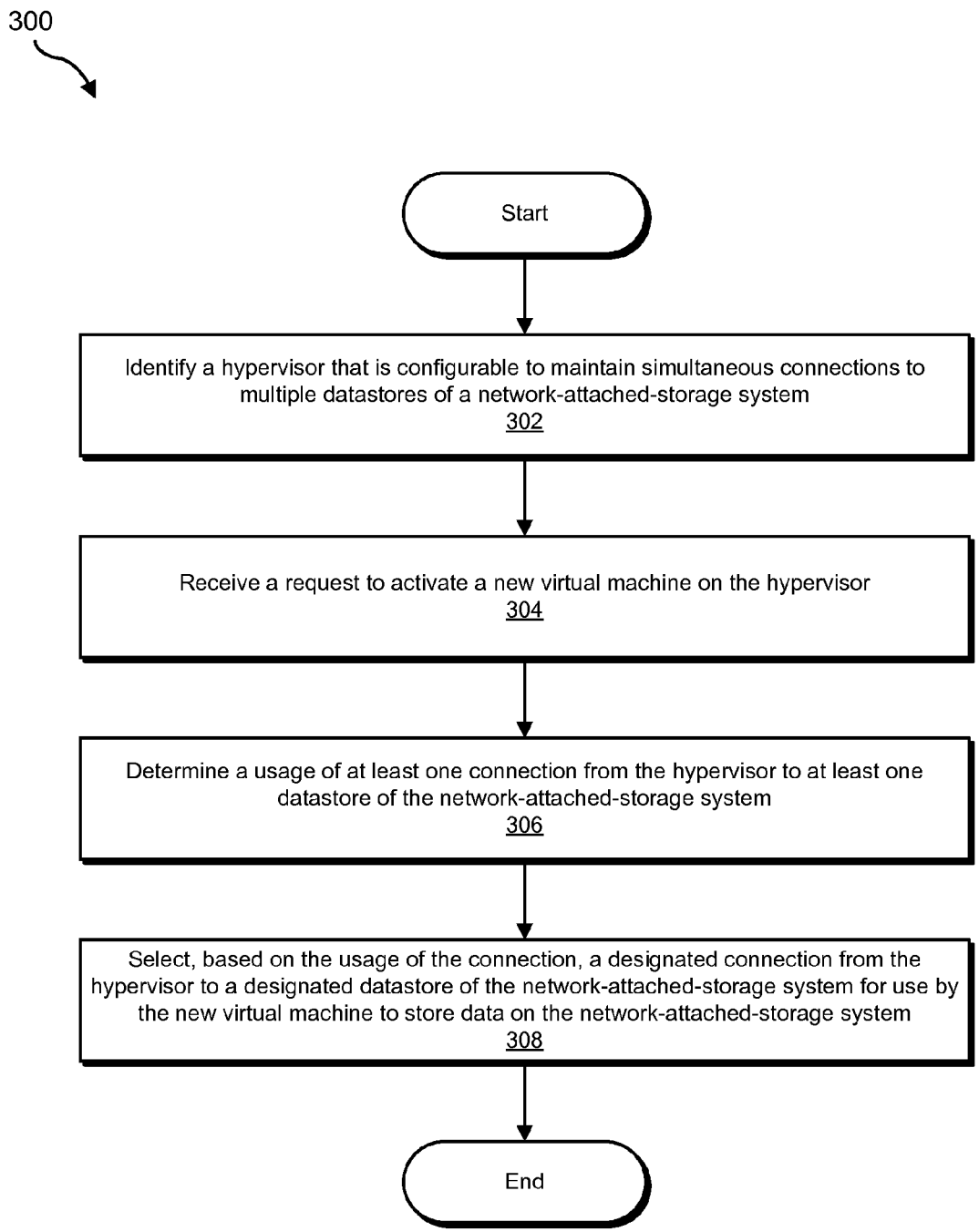
FIG. 3 is a flow diagram of an exemplary method for instantly restoring virtual machines in high input/output load environments.
Figure 4:
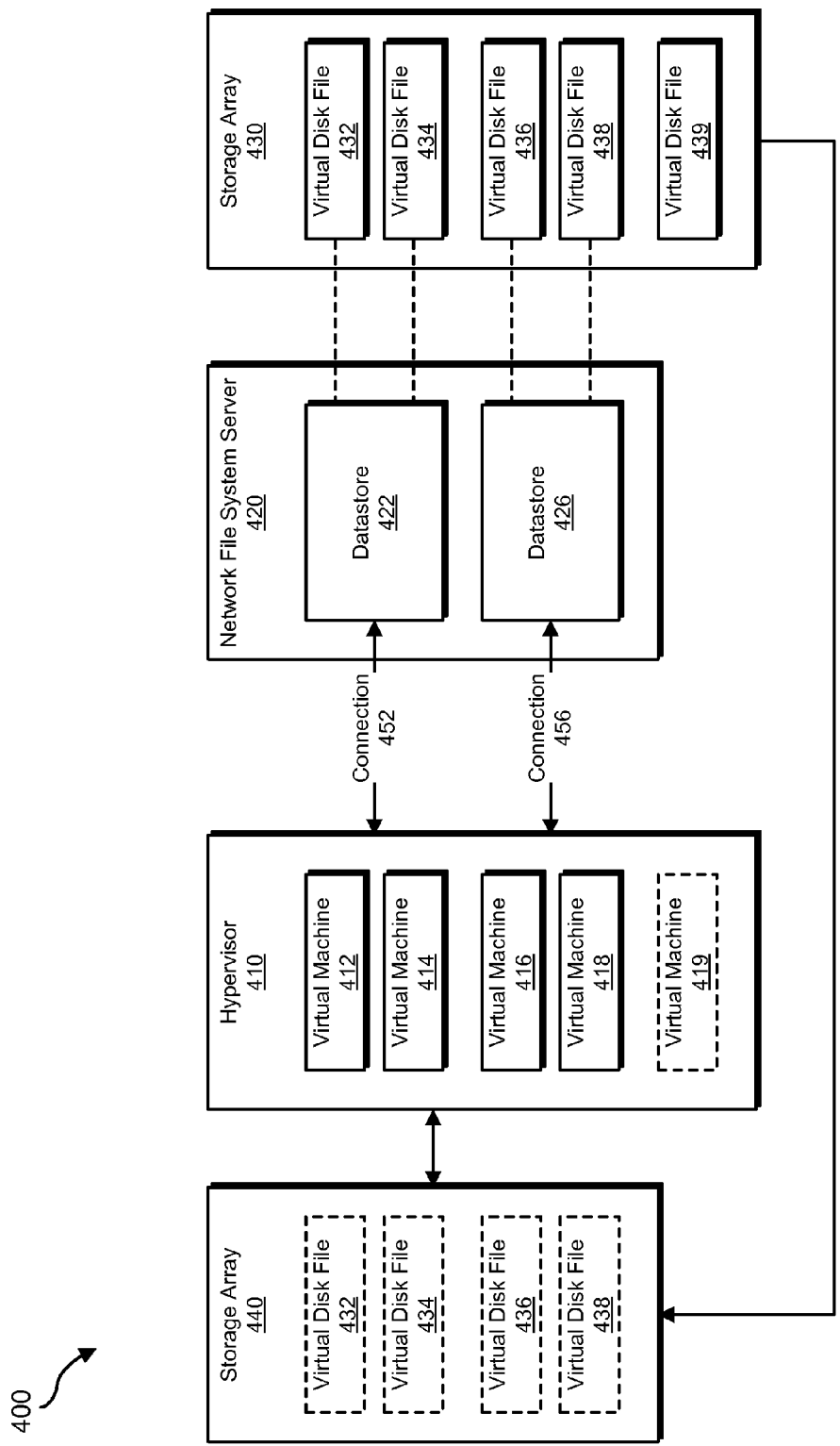
FIG. 4 is a block diagram of an exemplary system for instantly restoring virtual machines in high input/output load environments.

The following will provide, with reference to FIGS. 1, 2, and 4, detailed descriptions of exemplary systems for instantly restoring virtual machines in high input/output load environments. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for instantly restoring virtual machines in high input/output load environments. As illustrated in this figure, exemplary system 100 may include one or more modules 102 for performing one or more tasks. For example, and as will be explained in greater detail below, exemplary system 100 may also include an identification module 104 that may identify a hypervisor that may be configurable to maintain simultaneous connections to multiple datastores of a network-attached-storage system. Exemplary system 100 may additionally include a receiving module 106 that may receive a request to activate a new virtual machine on the hypervisor. Exemplary system 100 may also include a determination module 108 that may determine a usage of at least one connection from the hypervisor to at least one datastore of the network-attached-storage system. Exemplary system 100 may additionally include a selection module 110 that may select, based on the usage of the connection, a designated connection from the hypervisor to a designated datastore of the network-attached storage system for use by the new virtual machine to store data on the network-attached-storage system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or hypervisor 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a hypervisor 206 in communication with a computing device 202 and a network-attached-storage system 208 via a network 204. Computing device 202 may be programmed with one or more of modules 102. Additionally or alternatively, hypervisor 206 may be programmed with one or more of modules 102.

In one embodiment, one or more of modules 102 from FIG. 1 may, when executed by at least one processor of computing device 202 and/or hypervisor 206, facilitate computing device 202 and/or hypervisor 206 in instantly restoring virtual machines in high input/output load environments. For example, and as will be described in greater detail below, one or more of modules 102 may cause computing device 202 and/or hypervisor 206 to select connections to datastores for instantly restoring virtual machines in high input/output load environments. For example, and as will be described in greater detail below, identification module 104 may be programmed to identify hypervisor 206 that is configurable to maintain simultaneous connections to multiple datastores of a network-attached-storage system 208. Receiving module 106 may be programmed to receive a request 220 to activate a virtual machine 210 on hypervisor 206. Determination module 108 may be programmed to determine a usage 222 of connections 214 from the hypervisor to datastores 212 of network 204—attached-storage system. Selection module 110 may be programmed to select, based on usage 222 of connections 214, a designated connection (e.g., from connections 214) from hypervisor 206 to a designated datastore (e.g., from datastores 212) of network-attached storage system 208 for use by virtual machine 210 to store data on network-attached-storage system 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Hypervisor 206 generally represents any type or form of virtualization platform capable of running and/or managing multiple virtual machines on a single physical computing device. Examples of hypervisors include, without limitation, VMWARE ESX/ESXI, MICROSOFT HYPER-V, ORACLE VM, SUN VIRTUALBOX, CITRIX XENSERVER, any bare-metal hypervisor, and/or any hosted hypervisor. In some examples, the term "hypervisor" may refer to software executing on a physical computing device that manages the execution of virtual machines on the physical computing device and/or the physical computing device itself (e.g., a virtual machine manager).

Network-attached-storage system 208 may represent portions of a single storage device and/or computing device or a plurality of storage devices and/or computing devices. For example, network-attached-storage system 208 may represent a portion of computing system 510 in FIG. 5 and/or portions of exemplary network architecture 600 in FIG. 6. Alternatively, network-attached-storage system 208 in FIG. 2 may represent one or more physically separate devices capable of being accessed by a computing device, such as computing system 510 in FIG. 5 and/or portions of exemplary network architecture 600 in FIG. 6.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202, hypervisor 206, and/or network-attached-storage system 208.

FIG. 3 is a flow diagram of an exemplary computer-implemented method 300 for instantly restoring virtual machines in high input/output load environments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a hypervisor that is configurable to maintain simultaneous connections to multiple datastores of a network-attached-storage system. For example, at step 302 identification module 104 may, as part of computing device 202 in FIG. 2, identify hypervisor 206 that is configurable to maintain simultaneous connections to multiple datastores of a network-attached-storage system 208.

As used herein, the phrase "network-attached-storage system" may refer to any computing system and/or device capable of providing data storage services via a network. In some examples, a network-attached-storage system may include a server that provides one or more clients with remote access to data and/or storage available to the server. For example, the network-attached-storage system may include a Network File System (NFS) server.

As used herein, the term "datastore" may refer to any logical storage unit and/or location suitable for storing data for virtual machines (e.g., virtual machine disk. Examples of files that a datastore may store include, without limitation, virtual disk files, virtual machine configuration files, and virtual machine log files. In some examples, a datastore may provide a uniform storage interface for virtual machines across differing underlying storage systems and/or configurations. In one example, a set amount of resources for handling input/output operations may be allocated to each datastore.

As used herein, the term "connection" may refer to any relationship between a hypervisor and a datastore. Examples of connections may include, without limitation, a datastore being mounted for use by one or more virtual machines on a hypervisor and/or one or more virtual machines on a hypervisor being assigned to use a datastore for storage.

Identification module 104 may identify the hypervisor in any suitable manner. For example, identification module 104 may identify the hypervisor by reading a configuration file that identifies the hypervisor. In some examples, identification module 104 may identify the hypervisor by receiving a communication from the hypervisor and/or identifying a communication directed to the hypervisor. As will be explained in greater detail below, in some examples, identification module 104 may identify the hypervisor by receiving a request to activate a new virtual machine on the hypervisor. Additionally or alternatively, in some examples, identification module 104 may identify the hypervisor by executing on and/or as a part of the hypervisor.

Identification module 104 may identify the hypervisor in any suitable context. For example, FIG. 4 illustrates an exemplary system 400 for instantly restoring virtual machines in high input/output load environments. As shown in FIG. 4, system 400 may include a hypervisor 410, a network file system server 420, a storage array 430, and a storage array 440. Using exemplary system 400 as an example of identification module 104 performing step 302, at step 302 identification module 104 may identify hypervisor 410 that is configurable to maintain simultaneous connections (e.g., including connections 452 and 456) to datastores (e.g., including datastores 422 and 426) of network file system server 420.

Returning to FIG. 3, at step 304 one or more of the systems described herein may receive a request to activate a new virtual machine on the hypervisor. For example, at step 304 receiving module 106 may, as part of computing device 202 in FIG. 2, receive request 220 to activate virtual machine 210 on hypervisor 206.

As used herein, the phrase "virtual machine" generally refers to any operating system environment that is abstracted from computing hardware by a hypervisor.

Receiving module 106 may receive the request to activate the new virtual machine on the hypervisor in any suitable context. In one example, request module 106 may receive a request to activate the new virtual machine as a part of an instant recovery of a virtual machine. For example, request module 106 may receive a request to perform an instant recovery of the new virtual machine. As used herein, the phrase "instant recovery" may include any operation that provides an application with read/write access to data stored within a virtual disk of a virtual machine before the virtual disk has been completely restored.

Turning to FIG. 4 for an example of receiving module 106 performing step 304, hypervisor 410 may include virtual machines 412, 414, 416, and 418. At step 304, receiving module 106 may receive a request to instantiate a virtual machine 419 on hypervisor 410. In some examples, the receiving module 106 may receive the request as a part of a request to perform an instant recovery of virtual machine 419 (e.g., by allowing virtual machine 419 immediate access to a virtual disk file 439 while a live migration of virtual disk file 439 is performed from storage array 430 to storage array 440).

As used herein, the phrase "live migration" as applied to virtual machine data may refer to any migration and/or transfer of data that minimizes and/or eliminates downtime for a workload, application, and/or virtual machine that stores, accesses, and/or otherwise uses the data. For example, the phrase "live migration" may refer to ensuring that all write transactions to the data during the live migration are reflected at the target location at the end of the live migration and that an up-to-date version of the data is available throughout the live migration.

Returning to FIG. 3, at step 306 one or more of the systems described herein may determine a usage of at least one connection from the hypervisor to at least one datastore of the network-attached-storage system. For example, at step 306 determination module 108 may, as part of computing device 202 in FIG. 2, determine usage 222 of connections 214 from the hypervisor to datastores 212 of network 204—attached-storage system.

Determination module 108 may determine the connection usage from the hypervisor to datastores of the network-attached-storage system in any of a variety of ways. In some examples, determination module 108 may determine that the hypervisor is configurable to maintain an additional connection to an additional datastore of the network-attached-storage system. For example, determination module 108 may determine that the hypervisor may maintain a maximum of eight connections to eight separate datastores but that the hypervisor is currently only maintaining two connections to two separate datastores. Additionally or alternatively, determination module 108 may determine that the hypervisor has reached a maximum number of connections to datastores of the network-attached storage system. For example, determination module 108 may determine that the hypervisor may maintain a maximum of four connections to four separate datastores and that the hypervisor is currently maintaining four connections to four separate datastores.

In some examples, determination module 108 may determine the connection usage by monitoring the progress of one or more operations using existing connections to datastores. For example, determination module 108 may (1) identify a restoration operation that is restoring a virtual machine backup by using the connection to the datastore, (2) identify a progress indicator of the restoration operation, and (3) predict an input/output load on the connection to the datastore based on the progress indicator. In one example, determination module 108 may determine that the restoration of a virtual machine (e.g., to a production location) that was instantly recovered is 70% complete. Determination module 108 may then project the input/output load that the remaining 30% of the operation will place on the connection to the datastore.

In some embodiments, determination module 108 may determine the connection usage by monitoring the state of existing connections to datastores. For example, determination module 108 may (1) identify an input/output queue that is used to queue input/output operations transmitted to the network-attached-storage system via the connection to the datastore and (2) predict an expected latency of at least one additional input/output operation based on a size of the input/output queue. For example, determination module 108 may determine that an input/output queue for a connection to a datastore includes 500 megabytes of incomplete input/output transactions. Determination module 108 may then determine that additional input/output operations via the connection to the datastore face a latency of 50 milliseconds.

In some examples, determination module 108 may determine a degree to which the connection to the datastore is used for asynchronous input/output operations. For example, determination module 108 may determine what proportion of activity on the connection to the datastore is used for storage migration of virtual machines. Additionally or alternatively, determination module 108 may determine the usage of the connection to the datastore by determining a degree to which the connection to the datastore is used for synchronous input/output operations. For example, determination module 108 may determine what proportion of activity on the connection to the datastore is used by applications running within virtual machines.

In one example, determination module 108 may determine the usage of the connection to the datastore by determining that the usage includes read operations from a deduplicated storage system. For example, determination module 108 may determine that underlying storage used for the datastore includes a deduplicated storage system. In this example, determination module 108 may assign a higher projected latency to the connection to the datastore based on the determination.

In some examples, determination module 108 may determine the usage of the connection to the datastore by determining that the usage includes an instant recovery of a virtual machine. Determination module 108 may thereby project current and/or future input/output loads and/or current and/or future input/output latencies for the connection to the datastore.

Using FIG. 4 as an example of determination module 108 performing step 306, storage array 430 may include virtual disk files 432, 434, 436, 438 that correspond to virtual machines 412, 414, 416, and 418, respectively. An instant recovery of virtual machines 412, 414, 416, and 418 may have resulted in datastore 422 being exposed to hypervisor 410 via a connection 452 to provide virtual machines 412 and 414 with instant access to virtual disk files 432 and 434 while virtual disk files 432 and 434 are migrated to a production location (e.g., storage array 440). Likewise, the instant recovery of virtual machines 412, 414, 416, and 418 may have resulted in datastore 426 being exposed to hypervisor 410 via a connection 456 to provide virtual machines 416 and 418 with instant access to virtual disk files 436 and 438 while virtual disk files 436 and 438 are migrated to storage array 440. In one example, determination module 108 may determine the usage of connections 452 and 456 to datastores 422 and 426 by determining the progress of the live migrations of virtual disk files 432, 434, 436, and 438 to storage array 440. For example, the migrations of virtual disk files 432 and 434 may be mostly complete, meaning relatively few future asynchronous input/output operations via connection 452 to datastore 422 (and potentially low latency for future synchronous input/output operations via connection 452 to datastore 422). Additionally, the migrations of virtual disk files 436 and 438 may be far from complete, meaning relatively many future asynchronous input/output operations via connection 456 to datastore 426 (and potentially high latency for future synchronous input/output operations via connection 456 to datastore 426).

Returning to FIG. 3, at step 308 one or more of the systems described herein may select, based on the usage of the connection, a designated connection from the hypervisor to a designated datastore of the network-attached storage system for use by the new virtual machine to store data on the network-attached-storage system. For example, at step 308 selection module 110 may, as part of computing device 202 in FIG. 2, select, based on usage 222 of connections 214, a designated connection (e.g., from connections 214) from hypervisor 206 to a designated datastore (e.g., from datastores 212) of network-attached storage system 208 for use by virtual machine 210 to store data on network-attached-storage system 208.

Selection module 110 may select the designated connection in any of a variety of ways. For example, as mentioned earlier, one or more of the systems described herein may have determined that additional connections to additional datastores are available to the hypervisor. In this example, selection module 110 may select an additional connection to an additional datastore (e.g. by creating a new connection to a new datastore) for use by the new virtual machine to store data on the network-attached-storage system. Alternatively, one or more of the systems described herein may have determined that no additional connections are available to the hypervisor. In this example, selection module 110 may select the designated connection by determining that an input/output load on the designated connection to the designated datastore is less than an input/output load on a different connection to a different datastore of the network-attached-storage system.

In some examples, selection module 110 may select the designated connection to the designated datastore based at least in part on the degree to which the connection to the datastore is used for asynchronous input/output operations. Additionally or alternatively, selection module 110 may select the designated connection to the designated datastore based at least in part on the degree to which the connection to the datastore is used for synchronous input/output operations.

For example, selection module 110 may select the designated connection to the designated datastore because the new virtual machine requires low latency for synchronous input/output operations (e.g., for applications running within the new virtual machine) and the designated connection to the designated datastore is used for few asynchronous input/output operations (e.g., because storage migrations performed via the designated connection to the designated datastore are almost complete).

Turning to FIG. 4, in some examples selection module 110 may select a new connection to a new datastore for virtual machine 419 to access virtual disk file 439 (e.g., because hypervisor 410 allows more than two simultaneous connections to datastores). In other examples, selection module 110 may select connection 456 to datastore 426 for virtual machine 419 and virtual disk file 439 because the input/output load on connection 452 to datastore 426 is higher than the input/output load on connection 456 to datastore 426. In one example, selection module 110 may select connection 456 to datastore 426 for virtual machine 419 and virtual disk file 439 because an input/output queue for connection 452 to datastore 422 is relatively large and an input/output queue for connection 456 to datastore 426 is relatively small.

As explained above in connection with method 300 in FIG. 3, by using multiple connections to datastores from a hypervisor to distribute the input/output load of multiple virtual machines (e.g., that are in various stages of instant recovery and live migration), the systems described herein may reduce input/output latency and thereby improve the performance of applications within virtual machines.

Virtual machine instant recovery may dramatically reduce the recovery time objective of an application from several hours to only a few minutes when backup images can be accessed from conventional disk-based storage or deduplicated storage. Unfortunately, performance issues may arise because of high input/output latency from deduplicated storage upon which a virtual machine depends and/or asynchronous input/output operations from the storage migration of the virtual machine. These factors may impede the synchronous input/output operations initiated by guest operating systems in other virtual machines because input/output operations pertaining to multiple virtual machines may share the same NFS connection to an instant recovery datastore.

In one example, systems described herein may scale the number of virtual machines that may efficiently operate in instant recovery scenarios by leveraging the number of connections that can be opened from a hypervisor (e.g., ESX SERVER) to an NFS server. Using this approach, systems described herein may scale the number of virtual machines that can be supported from backup storage. After reaching the maximum number of connections that may be opened per NFS server, the systems described herein may use load balancing (e.g., determine which NFS connection from the hypervisor has the least load) to activate a new virtual machine on the least-loaded NFS connection.

For example, if a hypervisor may open a maximum of four unique connections per NFS server, when a backup system (e.g., NETBACKUP) receives a request for activating and/or restoring a virtual machine using an instant recovery technique, the systems described herein may use the following steps: (1) If it is the first request for the hypervisor, NETBACKUP may create a new datastore and activate the virtual machine on the newly created datastore (or NFS mount point). (2) If it is not the first request, and if the number of datastores created is not more than the pre-determined maximum value (i.e., four), NETBACKUP may create a new datastore and activate the virtual machine on the newly created datastore. (3) If the maximum number of datastores (i.e., four) have already been created, when NETBACKUP receive a new request for activating a virtual machine it may determine which datastore (or NFS connection) is least loaded. NETBACKUP may then activate the virtual machine on that particular datastore.

The above technique may help to ensure that guest operating systems on newly created virtual machines using instant recovery techniques will not face competition (or will face minimal competition) from existing storage migration input/output operations. This may improve the synchronous input/output performance for newly created virtual machines. For example, if each datastore supports N virtual machines, and the hypervisor supports M connections to datastores, the preceding steps may enable scaling up to M*N virtual machines.

Figure 5:
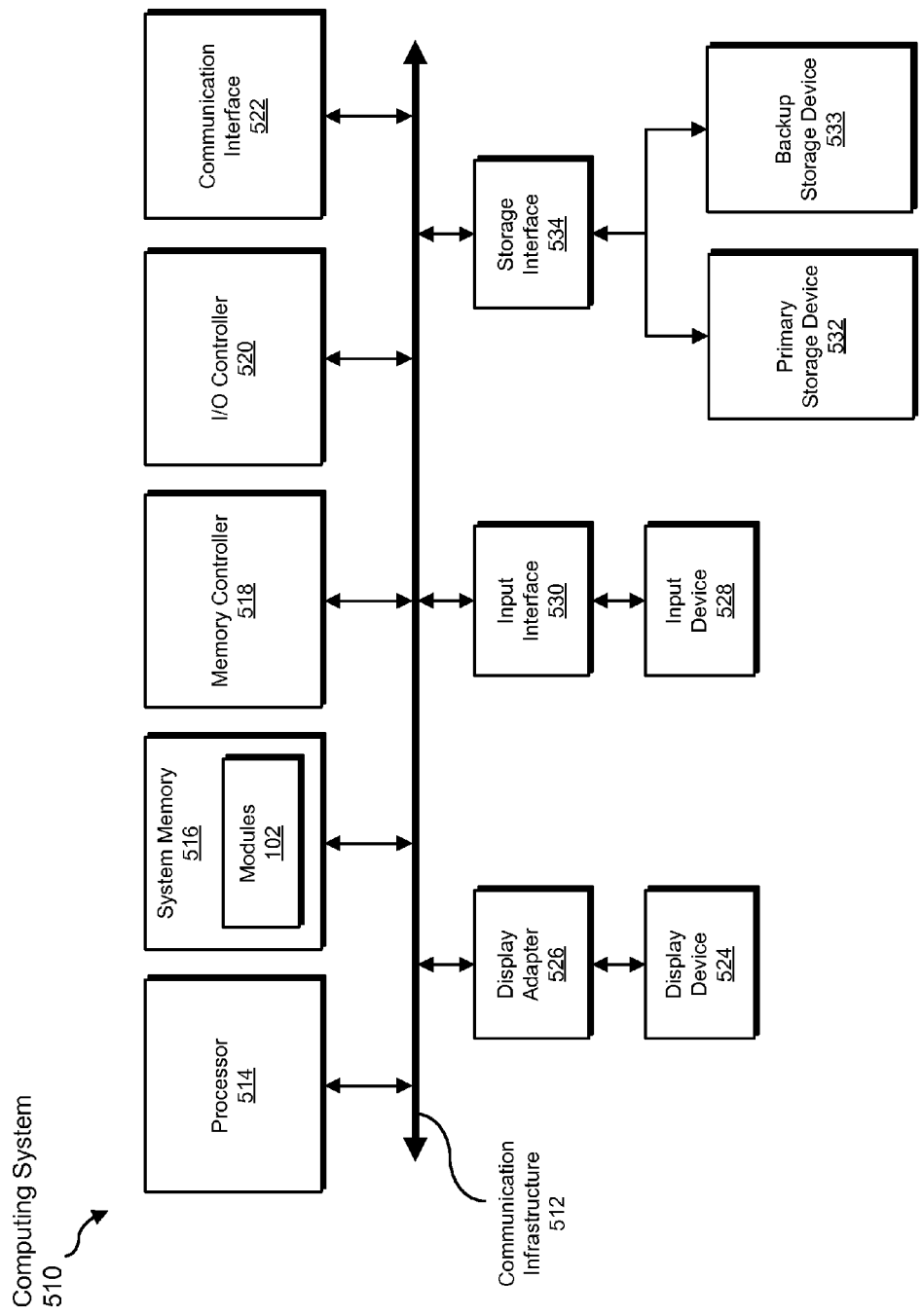
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530.

Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660 (1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols and/or architectures, such as Network File System (NFS), Server Message Block (SMB), Common Internet File System (CIFS), Simple Object Access Protocol (SOAP), or Representational State Transfer (REST).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for instantly restoring virtual machines in high input/output load environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 and/or computing system 510 in FIG. 5 may be implemented within a virtual environment. For example, modules and/or data described herein may reside and/or execute within a virtual machine. Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data about connections between hypervisors and NFS datastores, transform the data, output a result of the transformation to a hypervisor, use the result of the transformation to select a connection to an NFS datastore for a new virtual machine, and store the result of the transformation to a configuration file on a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for instantly restoring virtual machines in high input/output load environments, at least a portion of the method being performed by a computing device comprising at least one processor, the method comprising:
   identifying a hypervisor that is configurable to maintain simultaneous connections to multiple datastores of a network-attached-storage system;
   receiving a request to activate a new virtual machine on the hypervisor;
   determining a usage of at least one connection from the hypervisor to at least one datastore of the network-attached-storage system at least in part by determining that the usage comprises an instant recovery of a virtual machine, wherein the instant recovery comprises providing an application with read/write access to data stored within a virtual disk of the virtual machine before the virtual disk has been completely restored;
   selecting, based on the usage of the connection, a designated connection from the hypervisor to a designated datastore of the network-attached-storage system for use by the new virtual machine to store data on the network-attached-storage system.

2. The computer-implemented method of claim 1, wherein:
   determining the usage of the connection comprises determining that the hypervisor is configurable to maintain an additional connection to an additional datastore of the network-attached-storage system;
   selecting the designated connection to the designated datastore comprises selecting the additional connection to the additional datastore for use by the new virtual machine to store data on the network-attached-storage system.

3. The computer-implemented method of claim 1, wherein:
   determining the usage of the connection comprises determining that the hypervisor has reached a maximum number of connections to datastores of the network-attached-storage system;
   selecting the designated connection to the designated datastore comprises determining that an input/output load on the designated connection to the designated datastore is less than an additional input/output load on an additional connection to an additional datastore of the network-attached-storage system.

4. The computer-implemented method of claim 1, wherein determining the usage of the connection to the datastore comprises:
   identifying a restoration operation that is restoring a virtual machine backup by using the connection to the datastore;
   identifying a progress indicator of the restoration operation;
   predicting an input/output load on the connection to the datastore based on the progress indicator.

5. The computer-implemented method of claim 1, wherein determining the usage of the connection to the datastore comprises:
   identifying an input/output queue that is used to queue input/output operations transmitted to the network-attached-storage system via the connection to the datastore;
   predicting an expected latency of at least one additional input/output operation based on a size of the input/output queue.

6. The computer-implemented method of claim 1, wherein:
   determining the usage of the connection to the datastore comprises determining a degree to which the connection to the datastore is used for asynchronous input/output operations;
   selecting the designated connection to the designated datastore is based at least in part on the degree to which the connection to the datastore is used for asynchronous input/output operations.

7. The computer-implemented method of claim 1, wherein:
   determining the usage of the connection to the datastore comprises determining a degree to which the connection to the datastore is used for synchronous input/output operations;

selecting the designated connection to the designated datastore is based at least in part on the degree to which the connection to the datastore is used for synchronous input/output operations.

8. The computer-implemented method of claim 1, wherein determining the usage of the connection to the datastore comprises determining that the usage comprises read operations from a deduplicated storage system.

9. The computer-implemented method of claim 1, wherein receiving the request to activate the new virtual machine comprises receiving a request to perform an instant recovery of the new virtual machine, wherein the instant recovery comprises providing an application with read/write access to data stored within a virtual disk of the new virtual machine before the virtual disk has been completely restored.

10. The computer-implemented method of claim 1, further comprising activating the new virtual machine using the designated connection from the hypervisor to the designated datastore of the network-attached-storage system.

11. A system for instantly restoring virtual machines in high input/output load environments, the system comprising:
an identification module that identifies a hypervisor that is configurable to maintain simultaneous connections to multiple datastores of a network-attached-storage system;
a receiving module that receives a request to activate a new virtual machine on the hypervisor;
a determination module that determines a usage of at least one connection from the hypervisor to at least one datastore of the network-attached-storage system at least in part by determining that the usage comprises an instant recovery of a virtual machine, wherein the instant recovery comprises providing an application with read/write access to data stored within a virtual disk of the virtual machine before the virtual disk has been completely restored;
a selection module that selects, based on the usage of the connection, a designated connection from the hypervisor to a designated datastore of the network-attached-storage system for use by the new virtual machine to store data on the network-attached-storage system;
at least one processor configured to execute the identification module, the receiving module, the determination module, and the selection module.

12. The system of claim 11, wherein:
the determination module determines the usage of the connection by determining that the hypervisor is configurable to maintain an additional connection to an additional datastore of the network-attached-storage system;
the selection module selects the designated connection to the designated datastore by selecting the additional connection to the additional datastore for use by the new virtual machine to store data on the network-attached-storage system.

13. The system of claim 11, wherein:
the determination module determines the usage of the connection by determining that the hypervisor has reached a maximum number of connections to datastores of the network-attached-storage system;
the selection module selects the designated connection to the designated datastore by determining that an input/output load on the designated connection to the designated datastore is less than an additional input/output load on an additional connection to an additional datastore of the network-attached-storage system.

14. The system of claim 11, wherein the determination module determines the usage of the connection to the datastore by:
identifying a restoration operation that is restoring a virtual machine backup by using the connection to the datastore;
identifying a progress indicator of the restoration operation;
predicting an input/output load on the connection to the datastore based on the progress indicator.

15. The system of claim 11, wherein the determination module determines the usage of the connection to the datastore by:
identifying an input/output queue that is used to queue input/output operations transmitted to the network-attached-storage system via the connection to the datastore;
predicting an expected latency of at least one additional input/output operation based on a size of the input/output queue.

16. The system of claim 11, wherein:
the determination module determines the usage of the connection to the datastore by determining a degree to which the connection to the datastore is used for asynchronous input/output operations;
the selection module selects the designated connection to the designated datastore based at least in part on the degree to which the connection to the datastore is used for asynchronous input/output operations.

17. The system of claim 11, wherein:
the determination module determines the usage of the connection to the datastore by determining a degree to which the connection to the datastore is used for synchronous input/output operations;
the selection module selects the designated connection to the designated datastore based at least in part on the degree to which the connection to the datastore is used for synchronous input/output operations.

18. The system of claim 11, wherein the determination module determines the usage of the connection to the datastore by determining that the usage comprises read operations from a deduplicated storage system.

19. A non-transitory computer-readable-storage medium comprising one or more computer-readable instructions that, when executed by at least one processor of a computing device, cause the computing device to:
identify a hypervisor that is configurable to maintain simultaneous connections to multiple datastores of a network-attached-storage system;
receive a request to activate a new virtual machine on the hypervisor;
determine a usage of at least one connection from the hypervisor to at least one datastore of the network-attached-storage system at least in part by determining that the usage comprises an instant recovery of a virtual machine, wherein the instant recovery comprises providing an application with read/write access to data stored within a virtual disk of the virtual machine before the virtual disk has been completely restored;
select, based on the usage of the connection, a designated connection from the hypervisor to a designated datastore of the network-attached-storage system for use by the new virtual machine to store data on the network-attached-storage system.

20. The non-transitory computer-readable-storage medium of claim 19, wherein:
  determining the usage of the connection comprises determining that the hypervisor is configurable to maintain an additional connection to an additional datastore of the network-attached-storage system;
  selecting the designated connection to the designated datastore comprises selecting the additional connection to the additional datastore for use by the new virtual machine to store data on the network-attached-storage system.

* * * * *